(12) United States Patent
Björk et al.

(10) Patent No.: US 10,259,633 B2
(45) Date of Patent: Apr. 16, 2019

(54) PACKAGE MATERIAL AND PACKAGE CONTAINER FORMED WITH SAID MATERIAL

(71) Applicant: Tetra Laval Holdings & Finance S.A., Pully (CH)

(72) Inventors: Jonas Björk, Lund (SE); Bengt Håkansson, Sjöbo (SE); Johan Nordgren, Malmö (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 15/549,529

(22) PCT Filed: Jan. 27, 2016

(86) PCT No.: PCT/EP2016/051719
§ 371 (c)(1),
(2) Date: Aug. 8, 2017

(87) PCT Pub. No.: WO2016/128218
PCT Pub. Date: Aug. 18, 2016

(65) Prior Publication Data
US 2018/0029773 A1  Feb. 1, 2018

(30) Foreign Application Priority Data
Feb. 9, 2015  (SE) ...................... 1550142

(51) Int. Cl.
*B65D 75/70* (2006.01)
*B32B 15/08* (2006.01)
(Continued)

(52) U.S. Cl.
CPC .............. *B65D 75/70* (2013.01); *B32B 15/08* (2013.01); *B32B 27/08* (2013.01); *B65D 5/065* (2013.01);
(Continued)

(58) Field of Classification Search
CPC ........ B65D 75/70; B65D 5/701; B65D 65/40; B65D 75/42; B65D 75/5805; B65D 85/72; B32B 27/08; B32B 2439/70
(Continued)

(56) References Cited

U.S. PATENT DOCUMENTS 3,437,227 A    4/1969  Peyser
3,494,500 A *  2/1970  Foster .................. B65D 17/506
                                                220/269
(Continued)

FOREIGN PATENT DOCUMENTS

DE   10 2008 002853    12/2009
EP       2889231        7/2015
(Continued)

OTHER PUBLICATIONS

Written Opinion / IPRP in corresponding PCT Application No. PCT/EP2016/051719 dated Aug. 15, 2017 (8 pages).
(Continued)

*Primary Examiner* — Jes F Pascua
(74) *Attorney, Agent, or Firm* — Finnegan, Henderson, Farabow, Garrett & Dunner LLP (57) ABSTRACT

A package material comprises a multilayer material structure with layers of plastic laminate, a penetration area (5, 62, 250) and two weakening lines (10) creating an area in between. The package material comprises an opening device with a first (3, 63, 220) and second (2, 222) portion attached to respective sides and a material bridge (31, 65, 231) penetrating the penetration area and connecting the first portion to the second portion. The second portion at least partly covers the penetration area and comprising a rupture section (13, 213) covering at least partly the two weakening lines. The rupture section comprises one or more rupture recesses (14, 141-145, 232) disposed over or adjacent to the
(Continued)

US 10,259,633 B2

Page 2 weakening lines for guiding a rupture of the multilayer material structure along the weakening lines.

17 Claims, 10 Drawing Sheets

(51) Int. Cl.
| | |
|---|---|
| B65D 5/70 | (2006.01) |
| B65D 5/06 | (2006.01) |
| B65D 5/54 | (2006.01) |
| B65D 85/72 | (2006.01) |
| B32B 27/08 | (2006.01) |
| B65D 65/40 | (2006.01) |
| B65D 75/42 | (2006.01) |
| B65D 75/58 | (2006.01) |

(52) U.S. Cl.
CPC ........... *B65D 5/5405* (2013.01); *B65D 5/701* (2013.01); *B65D 65/40* (2013.01); *B65D 75/42* (2013.01); *B65D 75/5805* (2013.01); *B65D 85/72* (2013.01); *B32B 2439/70* (2013.01)

(58) Field of Classification Search
USPC ........... 383/202, 205; 229/123.1, 123.2, 204, 229/210, 213, 214, 238, 87.05; 220/265–270, 277, 278
See application file for complete search history.

(56) References Cited

U.S. PATENT DOCUMENTS

| | | | | |
|---|---|---|---|---|
| 4,155,481 A | * | 5/1979 | Takahashi | B65D 17/508 220/270 |
| 4,364,478 A | * | 12/1982 | Tuns | B65D 75/68 383/205 |
| 4,408,697 A | | 10/1983 | Yoshikawa et al. | |
| 4,828,138 A | | 5/1989 | Andersson | |
| 5,029,752 A | | 7/1991 | Andersson | |
| 5,054,642 A | * | 10/1991 | Yoshida | B29C 45/1418 220/269 |
| 5,328,045 A | * | 7/1994 | Yoshida | B29C 45/14221 220/269 |
| 5,395,005 A | * | 3/1995 | Yoshida | B29C 45/14221 220/270 |
| 5,653,383 A | * | 8/1997 | Adachi | B65D 5/708 220/359.2 |
| 5,836,697 A | * | 11/1998 | Chiesa | B65D 75/66 383/205 |
| 7,032,810 B2 | * | 4/2006 | Benedetti | B65D 77/32 229/125.15 |
| 10,081,469 B2 | * | 9/2018 | Bjork | B65D 75/70 |
| 2010/0258616 A1 | | 10/2010 | Baker | |
| 2018/0105354 A1 | * | 4/2018 | Bjork | B65D 5/701 |

FOREIGN PATENT DOCUMENTS

| | | |
|---|---|---|
| GB | 2003446 | 3/1979 |
| GB | 2121773 | 1/1984 |
| JP | 5483590 | 7/1979 |
| JP | S61 178327 | 8/1986 |
| JP | H02 19247 | 1/1990 |
| JP | 9301355 | 11/1997 |
| JP | 2002-128125 | 5/2002 |
| WO | WO 00-17060 | 3/2000 |
| WO | WO 03/095199 | 11/2003 |
| WO | WO 2009/000927 | 12/2008 |
| WO | WO 2015/101427 | 7/2015 |
| WO | WO 2015-169656 | 11/2015 |

OTHER PUBLICATIONS

International-Type Search Report from corresponding Swedish Application No. 1550142-2 dated Feb. 9, 2015 (5 pages).

* cited by examiner

PACKAGE MATERIAL AND PACKAGE CONTAINER FORMED WITH SAID MATERIAL

This is a National Phase of PCT Application No. PCT/EP2016/051719, filed Jan. 27, 2016, which claims the benefit of SE Application No. 1550142-2 filed Feb. 9, 2015, all of which are incorporated herein by reference.

TECHNICAL FIELD

The present invention relates to a package material and to a package container comprising such material.

BACKGROUND OF THE INVENTION

Package containers of the single use disposable type for food products are often produced from a packaging material. Such packaging material may include paperboard or carton, but may also just contain different plastic layer or metalized film layers. Consequently different kind of food products, like liquid, semi-liquid or solid food products can be stored in such containers.

One example is related to a simple bag, which can contain several plastic layer sealed together to form a bag like shape in order to store for example potato chips, candy or other solid food products. Some other containers are suitable for aseptic packaging of liquid foods such as milk, fruit juices etc, marketed and sold for long term ambient storage. The packaging material in such package container is typically a laminate comprising a bulk layer of paper or paperboard, outer, liquid-tight layers of thermoplastics, a gas barrier layer, most commonly an aluminum foil and finally one or more inside layers composed of one or several part layers, comprising heat-sealable adhesive polymers and/or heat-sealable polyolefins.

Package containers are normally produced and filled on fully automatic packaging machines. In one example, a continuous tube is formed from the web-fed packaging material (said material can include carton based material, but pure plastic laminate may also be suitable); the web of packaging material is sterilized in the packaging machine, and the sterilized web of packaging material is maintained in a closed, sterile environment in the subsequent step. The web is folded and sealed longitudinally to form a vertical tube. The tube is filled with the sterilized or sterile-processed food product, and is sealed and subsequently cut along equally spaced cross sections to form pillow packs, which are then folded mechanically to form respective finished, e.g. substantially parallelepiped-shaped, package containers.

Commonly, the package container have an opening device in order to facilitate consumer opening, many different types of opening devices including pull-tabs or molded opening devices, as for example discussed in WO03/09519925 and WO2009/000927.

However, the latter type of package is a high-volume (in terms of packages per time unit) and low-cost package (due to the properties of the packaging material), and such opening devices might hamper the production speed and be detrimental for the cost of the package.

For this reason there is a need for an opening device having a high efficiency in regard of the amount of material used and the time needed for production of each opening device.

SUMMARY OF THE INVENTION

For the purpose of the invention, the term "package material blank" or "blank" shall include an individual sheet or a blank in a package material web. Such package material web may comprise one or more "package material blanks" arranged after each other in a continuous web, some of those blanks in different processing stages, i.e. on one blank in such web may comprise an opening device, while other blanks on the web might still be un-processed.

For the purpose of the invention, the terms "container, package" and "package" or "packaging container" refer to the same structure. In addition, the terms material, material laminate structure or packaging material refers to the package material blank. The term "cellulosic material" may comprise one or more layers of paper, card-board or any other cellulosic fiber based material.

In an embodiment, a package material comprises a multi-layer material structure with several layers of plastic laminate. A penetration area is defined in the multi-layer material structure. Two weakening lines in the multilayer material structure extend from the penetration area thereby creating an area on the multilayer material structure in between. To this extend the term "extend" shall include a direct extension from said penetration area but also extending close from said area so not directly adjacent to it but spaced apart.

In accordance with the present invention an opening device is provided, comprising a first and second section on both sides of the multilayer material structure and a bridge portion through the penetration area connecting both portions. The second portion comprises a rupture section, said rupture section covering at least partly the two weakening lines and at least partly the area in between. The rupture section comprise two or more respective rupture recesses disposed over or close to the weakening lines for guiding a rupture of the multilayer material structure along the weakening lines.

It was found during development of a previous version of an opening device using plastic injection for a multi-layer structure that the injected material may cause leakage problems through the weakening lines due to the high pressure used during the manufacturing process. The present invention overcomes any leakage issue by covering the weakening lines with a rupture section having respective recesses. In particular, the weakening can be deepened for easier opening without having the risk of leakage. Different kind of weakening can be used with mitigated risk of leakage. At the same time the recesses in the rupture section ensures a proper opening also the predefined weakening lines in the material.

Such weakening lines may include for example perforation or compression. Perforation may extend through all layers in the multilayer material structure or just some of some. To increase stickiness and integrity, the second section may also cover an additional small area outside the two weakening lines covered by the rupture portion. In an embodiment, the second section comprises a substantial rectangular shape of material covering an area including and surrounding the penetration area, the two weakening lines and the area in between the two weakening lines. The shape of the second section can also comprise curved or oval elements.

One aspect of the invention is related to a misalignment between the second section or the rupture section and the weakening lines during the manufacturing process. To improve tolerances an embodiment proposes a plurality of rupture recesses adjacent to each other. Even for a certain misalignment between the second section and the weakening lines, it is always ensured that one rupture recess will be arranged adjacent or over the weakening lines.

The rupture recess itself may have different shapes depending on the type of material used, the type and thickness of the multilayer material structure and the like. In one embodiment the rupture recess may comprise a triangular shape. In another embodiment it may comprise a U-shape or a rectangular shape. The depth of the recess may be in the range of 75% to 90% or more or less depending on the force desired to rupture the material. For example, the thickness can be in the range of 1 mm down to 0.5 mm. The depth of the recess may be in the range of 0.5 mm down to 0.1 mm, particularly between 0.25 mm and 0.15 mm. However, the depth is chosen such that integrity is maintained.

In an embodiment, a width of an inner part of the rupture section is larger a width than an outer part of the rupture section. The width corresponds to a lateral dimension, while the thickness corresponds to a transversal dimension. The inner part is the portion of the rupture section partly overlapping the area between the two weakening lines. The increased width of the inner part provides a more robust rupturing process. It was found that the rupture tends to move inwards. This behavior is reduced or even prevented with the adjacent area having an increased thickness.

In an embodiment the second section covers the area between the two weakening lines completely. To reduce material consumption the material thickness of a central portion of the second section in the area between the two weakening lines can be smaller than a thickness of an inner part of the rupture section. However it may also be larger than a thickness of a remaining material portion in the one or more rupture recesses.

To mitigate leakage, the rupture section covers the whole weakening lines till their respective end portions. The rupture section may comprise different shape at the respective end portions to stop the rupturing process. In an example, the rupture recess transforms into a recess bulge. In another embodiment it may surround it closely. It may comprise a hook like shape with the shorter portion of the hook facing outwards.

As stated before the weakening lines may start at the penetration area direction or slightly apart from it.

Irrespectively of the starting or end point of the weakening lines, the rupture recess may extend beyond. In a further embodiment, the portion of the second section covering the penetration area may include a recess extending adjacent to the two weakening lines across a portion of the second section covering the penetration area. This will provide an easier and well defined initial rupture.

SHORT DESCRIPTION OF THE DRAWINGS

In the following the present invention will be explained in more detailed with support of the accompanying drawing, in which.

DETAILED DESCRIPTION OF PREFERRED EMBODIMENTS OF THE INVENTION

Figure 1:
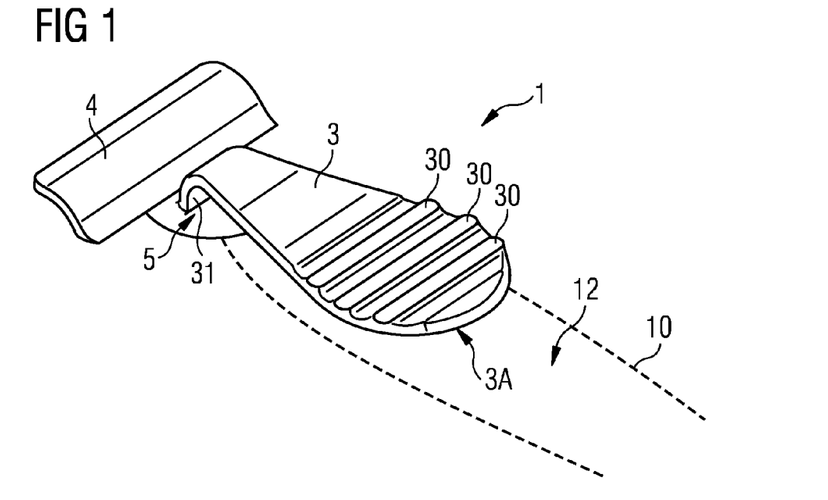
FIG. 1 shows a perspective view of a package material with an opening.

FIG. 1 shows a perspective view of a part of an opening device attached to a package material. The package material comprises a multilayer structure with one or more layers of plastic laminate. Between two layers of plastic laminate, one or more carton layers can be arranged. Such package material is well known and for example manufactured by Tetra Pak®. The package material comprises two weakening lines 10, implemented as perforation, which extend from a penetration area 5 in a slightly curved like manner. The package material can be ruptured along these perforations to create an opening in a package made from such material. Consequently, area 12 between the two perforations 10 acts as an opening.

The opening device itself comprises a spout 4 for better pourability and a grip portion 3. The grip portion 3 contains several periodically arranged ripples 30 for an improved grip by a user. Grip portion 3 is attached to a bridge portion 31 penetrating through the material in penetration area 5. Penetration area 5 contains at least one layer less than the surrounding material in the present embodiment.

Figure 2:
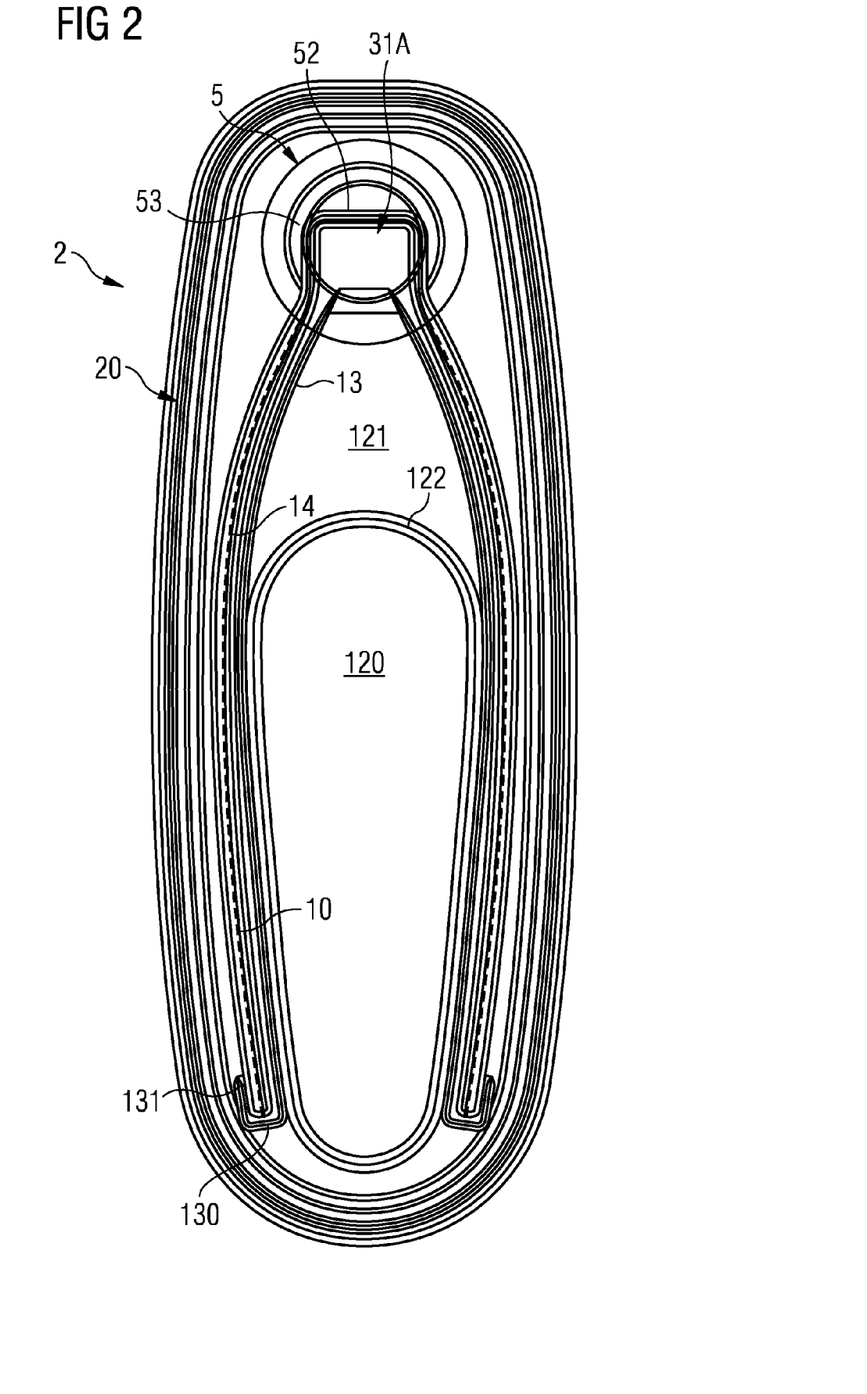
FIG. 2 shows a bottom view of a package material embodiment in accordance with the present invention.

A bottom view of an embodiment of the opening device attached to the package material is illustrated in FIG. 2. The opening device is injected molded into the package material, wherein as stated above, the bridge portion 31 connects the first portion to a second portion 2 shown in FIG. 2. Second portion 2 comprises a substantial rectangular plastic material area, 20. Area 20 is arranged over the penetration area 5 (shown here as a circle) and the two perforation lines 10 and consequently covers all features.

Bridge 31 (not shown) is penetrating area 5 and transforms into bridge portion 31A, said bridge portion being part of the second portion 2. A small circular step 53 surrounds the penetrating area of bridge 31. The material of section 2 covering penetration area 5 also comprises a recess 52 (shown in more detail in FIG. 1A), which follows the shape of bridge portion 31A and transforms in the area of the perforation 10 into a rupture recess 14. Said rupture recess is part of a rupture section 13, substantially arranged over and covering the whole perforation. At the respective end portion of perforation 10, the rupturing section forms a hook 130, wherein a short side 131 of hook 130 is facing outwards.

In the present embodiment, area 120 is not covered by any plastic material. Area 121 is slightly protruded and material steps 122 are provided to transform from area 120 into area 121 and the rupture sections 13 towards penetration. The rupture recess 14 is arranged over the perforation 10. When the package material is ruptured by a user, the recess 14 supports for guiding the rupturing line along the perforation 10.

The thickened areas on both sides of the recess 14 prevent a pulling of the rupturing out from its intended path.

Figure 2A:
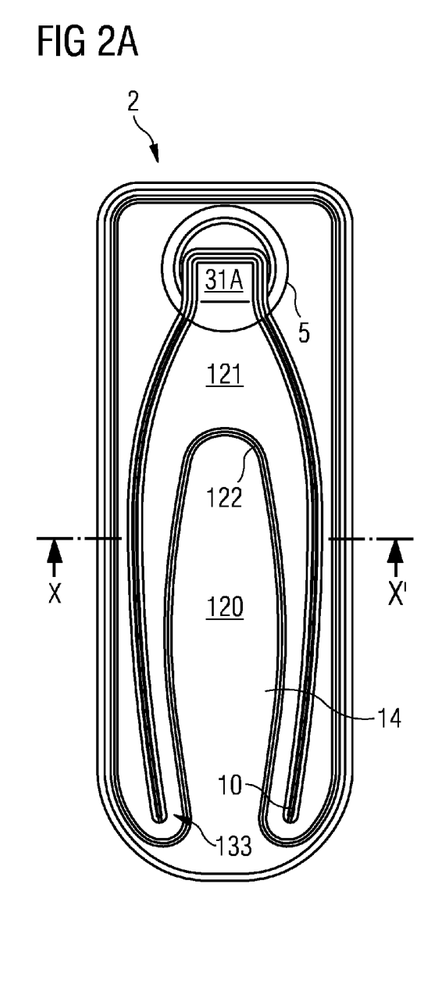
FIG. 2A illustrates a bottom view of a second embodiment.
Figure 2B:
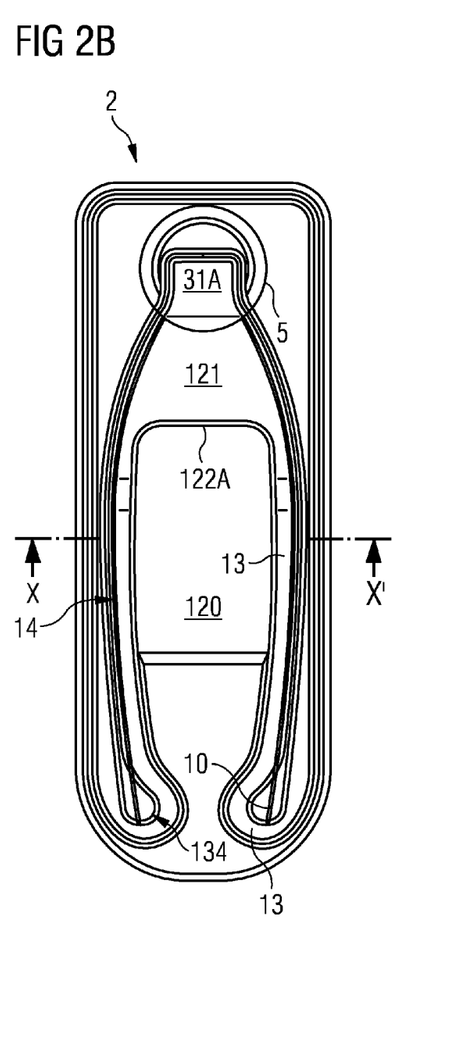
FIG. 2B illustrates a bottom view of a third embodiment.

Two alternative embodiments are illustrated in FIGS. 2A and 2B, respectively. Area 31A comprises a rectangular shape in the upper part adjacent to penetration area 5 and a round part on its lower end. Area 120 is covered by a thin material plastic layer. Rupture section 13 and 122 comprises a higher thickness and covers perforations 10 completely. The rupture recess 14 in rupture section 13 and 122 transforms into a recess covering penetration area 5 and following the borderline of bridge 31A. As one can see, step 122 follow a curved shape in the upper part close to penetration area 5. This is different in the alternative embodiment of FIG. 2B, in which it provides a more rectangular shape. Further only a single step 122A is disposed between area 120 and area 121 of the rupture section.

In addition, rupture section 13 comprise a bulge recess 134 in its end part covering the end portion of perforation 10.

The bulge recess is facing inward and surrounded by a protruded part of section 13.

Figure 3:
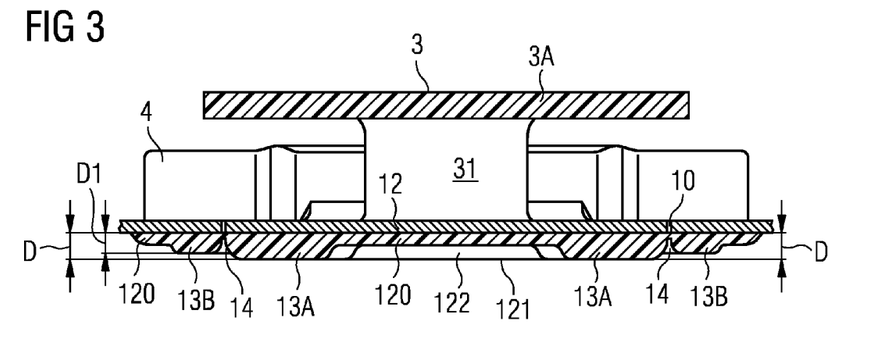
FIG. 3 shows a cut view along the X-X' axis of the embodiment of FIG. 2A.

FIG. 3 illustrates a cut view through axis X-X* of FIG. 2A. Rupturing recess 14 is arranged directly over the perforation 10 of material 12. The thickness of the remaining material inside recess 14 is approximately 20% to 10% of an average thickness of the surrounding material, or in other words a couple of μm. In this embodiment, the thickness D of the inner part 13A of the rupture section is larger than thickness D1. This is to prevent the tendency of the rupturing of moving inwards. The additional material effectively prevents this behavior. Towards the outer border of second portion 2, the rupturing section transforms into area 121.

Figure 4:
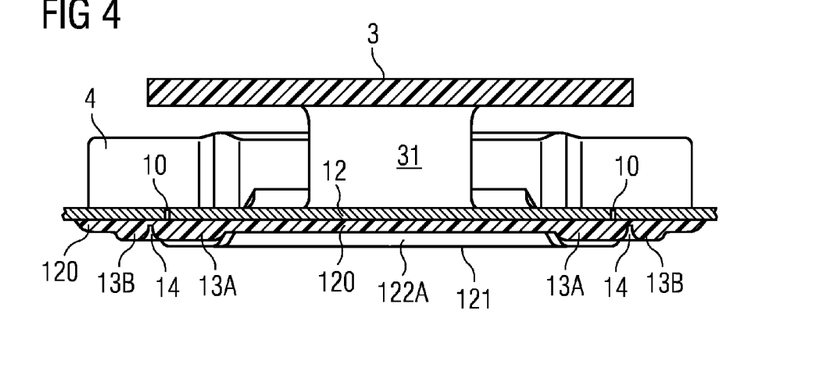
FIG. 4 shows a cut view along the X-X' axis of the embodiment of FIG. 2B.

FIG. 4 illustrating the cut view along the X-X' axis of the device at FIG. 2B differs mainly in the position between the perforation 10 and the rupture recesses 14. In the embodiment the rupture recesses 14 are staggered with respect to the perforation, namely recesses 14 are arranged further outwards. In other words, rupture section 13A are disposed above the perforations 10 in material 12.

A further aspect deals with a potential misalignment between the plastic material injection and the weakening lines of the material during production of the opening device in an injection molding process. Such mismatch most often occurs due to tolerances in the positions procedures short before or during the molding process. Smaller deviation in the relative position between the weakening lines and the recess in the injected plastic material can be compensated by broadening the recess 14 in the plastic material of the rupture section.

While those small deviations will not affect the quality of the opening, higher deviation (i.e. caused by a less sophisticated positioning system) may result in an undesired fraying. Such fraying is not only unappealing to a consumer, but may also cause food safety issues as small particles may be ripped off and fall into the consumable product.

Figure 1A:
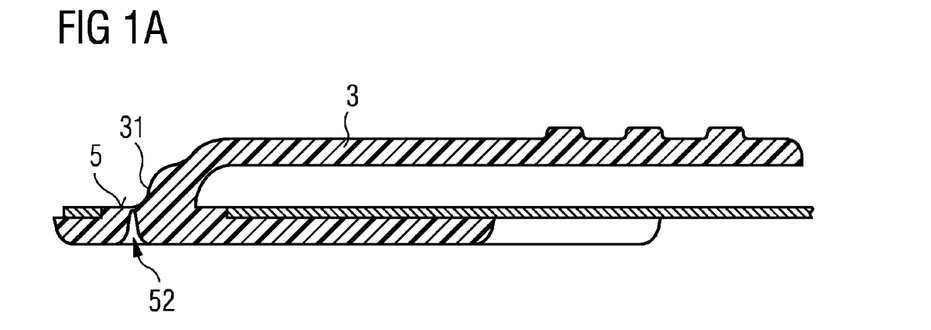
FIG. 1A shows the side view of a package material with an opening.
Figure 5A:
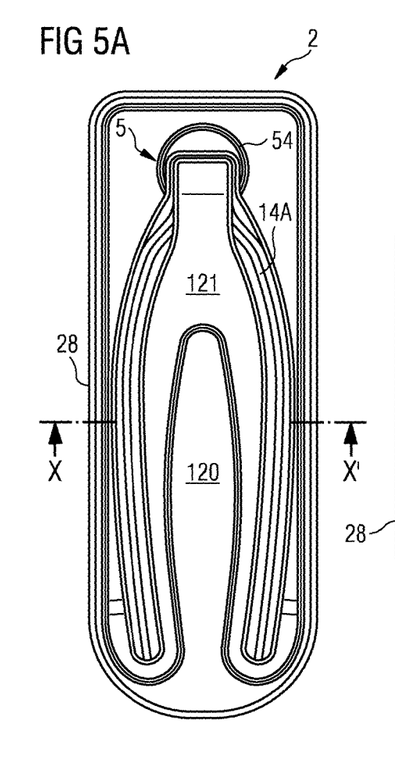
FIG. 5A illustrates a bottom view of a fourth embodiment in accordance with the present invention.
Figure 5B:
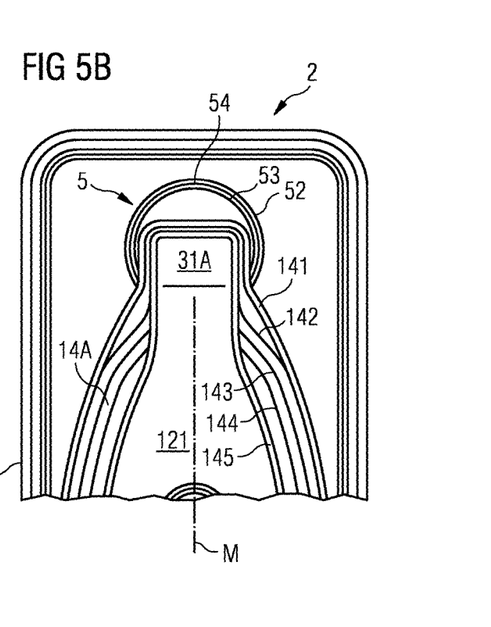
FIG. 5B shows a detailed portion of the fourth embodiment.

FIGS. 5A and 5B illustrate an embodiment which is more tolerant to misalignment between the weakening or perforation in the package material and the rupture section of the opening device. The opening device comprises a rupture section in section 2 having a plurality of adjacently arranged grooves or recesses 141 to 145. They are extending from an area close to penetration area 5 symmetrically to a mirror axis M. Their shape follows the direction of the weakening lines (not shown here). Recess 52 (similar as shown in FIG. 1A) in penetration area surrounding the border of bridget 3A transforms into the most outward rupture recess 141. Area 53 is recessed with respect to the surrounding part of section 2, the step 54 is a circular segment starting and ending on the transition between recess 52 and the outermost rupture recess 141.

Figure 6:
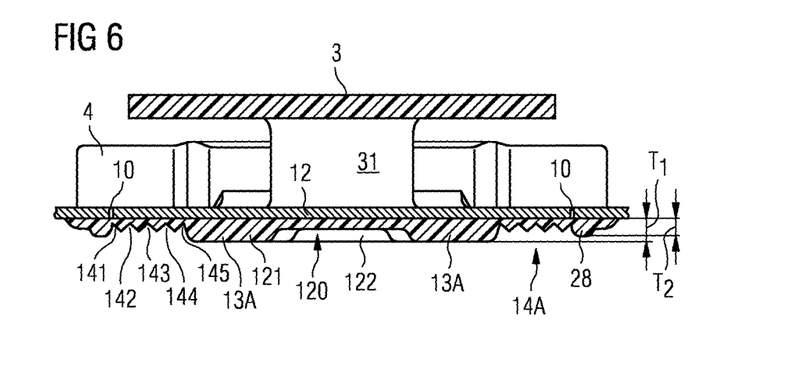
FIG. 6 shows a cut view along the X-X' axis of the embodiment of FIG. 5A.

As seen in FIG. 6, the each of the rupture recesses 141 to 145 are of triangular shape. Their respective heights (of each triangle) are smaller than the height T2 of the outer rupture section or height T1 of the inner rupture section. In other words, the triangles are smaller than both guiding parts 13A and 28 of the rupture section. The triangles form a tooth structure. The thickness of the remaining material goes down to a few μm. The area 120 in between the rupture guiding section has about the same thickness as the triangles.

Figure 7:
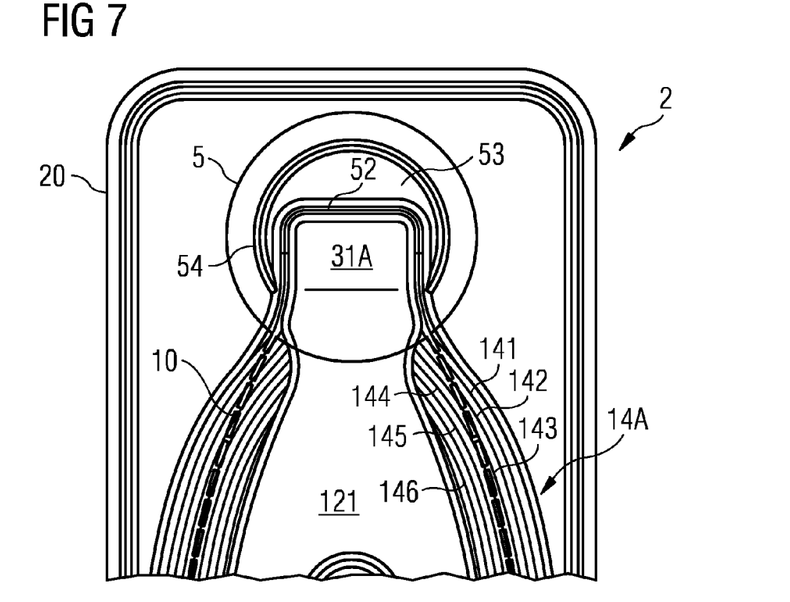
FIG. 7 illustrates the fourth embodiment including the outline of the penetration area and weakening lines.
Figure 8:
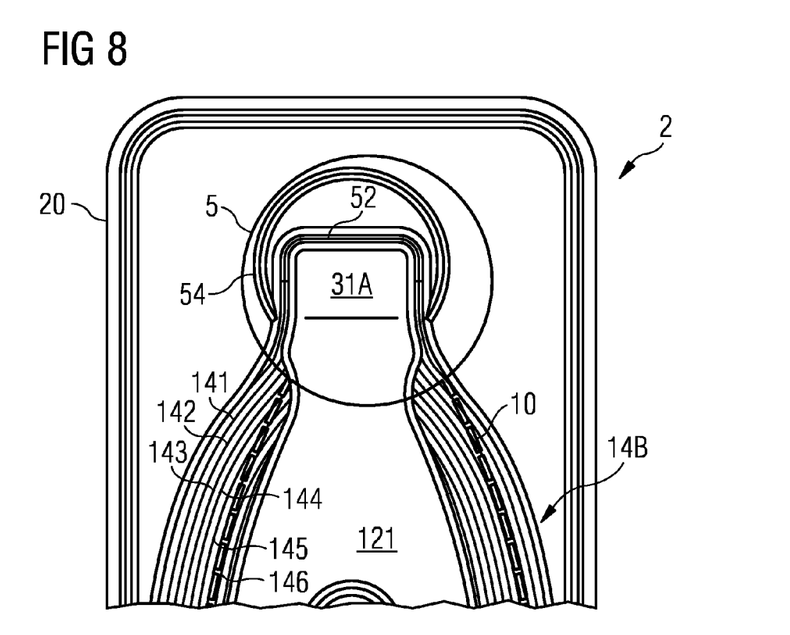
FIG. 8 shows the fourth embodiment in a slightly misaligned state.

The plurality of rupture recesses 141 to 145 increase the tolerances concerning misalignment between the opening device and the perforation lines in the package material in direction parallel but also transversal to the mirror axis M. FIGS. 7 and 8 illustrate a respective example. FIG. 7 shows the penetration area 5 and the perforations 10 extending from the perforation area. In this example, section 2 of the opening device and the package material are aligned. As one can see the perforation crosses three rupture recesses 141 to 143, as their angle and direction are slightly misaligned. In a larger distance from penetration area, perforation line 10 and the rupture recesses become both aligned and substantially parallel. Due to the slight misalignment in the direction, one of the rupture recesses 141 to 145 "catches" the rupture in the perforation line during the initial rupture process, after line 52 has been ruptured and the rupture extends from penetration area 5 into the package material. The misalignment in the upper parts between the perforation and the rupture recesses therefore ensure that the rupture is guided by one the rupture recesses and the perforation. The tendency by the rupture to move inwards is prevented. At the same time fraying is reduced.

FIG. 8 shows an embodiment of a misaligned structure, in which the opening device is displaced to the left compared to the penetration area and perforation. However the plurality of rupture recesses adjacent to each other result in a relative large cross distance in which section 2 can be displaced. Still as one can see, one of the rupture recesses, e.g rupture recess 146 and 143 overlap the perforation nonetheless in the lower par of the structure. During a rupturing process, the rupture recesses may "catch" the rupture and guide it along the perforation. The plurality of rupture recesses therefore ensure that even in a misalignment, the weakening or perforation is covered by one or more rupture recesses to provide proper guiding during the rupture process.

The present solution, also referred to as track solution provides a possibility to guide the rupturing along the perforation or any other weakening in package material, while at the same time reducing the risk for leakage through the weakening. Positioning tolerances can be increased using different techniques, like the multi-track solution in FIG. 5, but also larger recesses, inclined recess slopes in the rupture recesses and the like. The material used can be very thin and even on its thickest portion not exceed some 100 μm. the inner or central portion surrounded by the weakening or perforation lines can be covered by plastic material to enhance visible appeal but also increase stability during the opening procedure.

Figure 9:
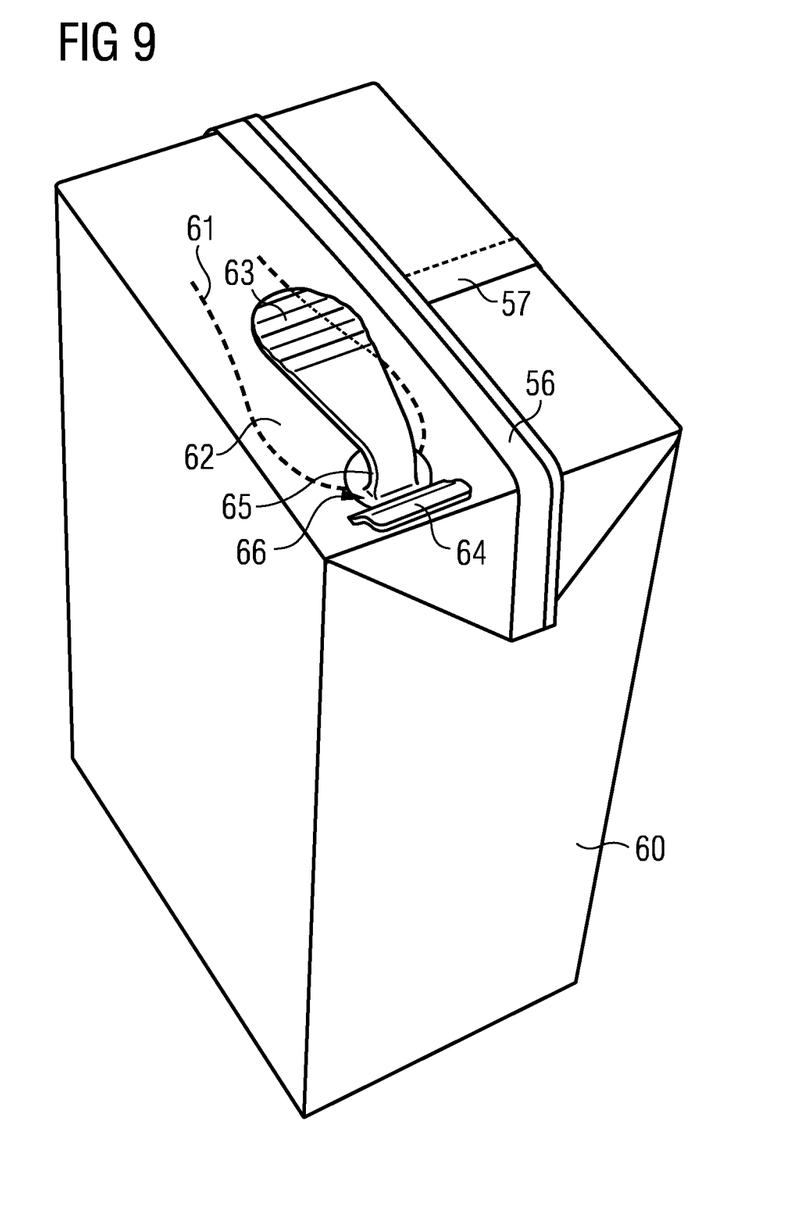
FIG. 9 shows an example of a packaging container produced from the packaging material according to embodiments described herein.

FIG. 9 shows an example of a packaging container 60 produced from the packaging material with an opening device described in FIG. 1 and which as specified herein has been provided with weakening lines 61, implemented as perforation, which extend from a penetration area 62 in a slightly curved manner. The package material can be ruptured along these perforations to create an opening in a package made from such material. Consequently, area 62 between the two perforations 61 acts as an opening. The opening device itself comprises a spout 64 for better pourability and a grip portion 63. Grip portion 63 is attached to a bridge portion 65 penetrating through the material in penetration area 66. Penetration area 66 contains at least one layer less than the surrounding material in the present embodiment. Consequently, the area 62 between the two perforations 61 acts as an opening.

The packaging container is particularly suitable for liquid or semi-liquid food products such as beverages, sauces, soups or the like. Typically, such a package has a volume of about 100 to 2000 ml. It may be of any configuration such as those described herein, but is for example brick-shaped, having transversal and longitudinal seals 56 and 57.

Figure 10:
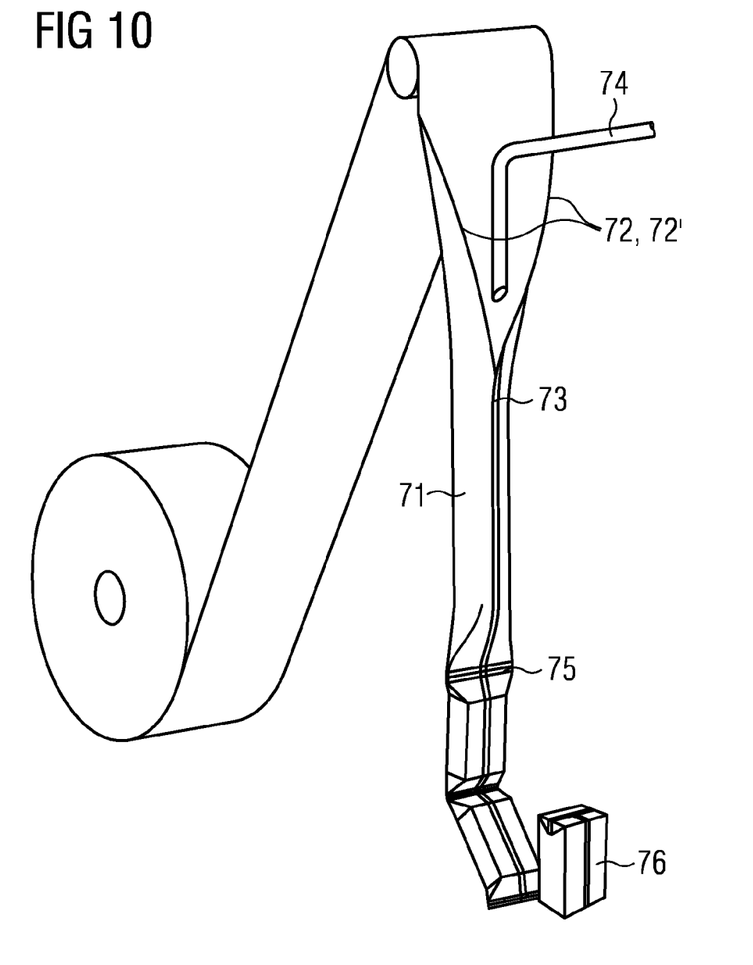
FIG. 10 shows the principle of how such packaging containers are manufactured from the packaging material in a continuous forming, filling and sealing process.

FIG. 10 shows the principle as described in the introduction of the present application, i.e. a web of packaging material is formed into a tube 71 by the longitudinal edges 72, 72' of the web being united to one another in an overlap heat-sealed joint 73. The tube is filled 74 with the intended liquid food product and is divided into individual packages by repeated transversal seals 56 of the tube at a predetermined distance from one another below the level of the filled contents in the tube exclusively by way of example, and that modifications and alterations obvious to a person skilled in the art are possible without departing from the concept as disclosed in the appended claims.

Figure 11A:
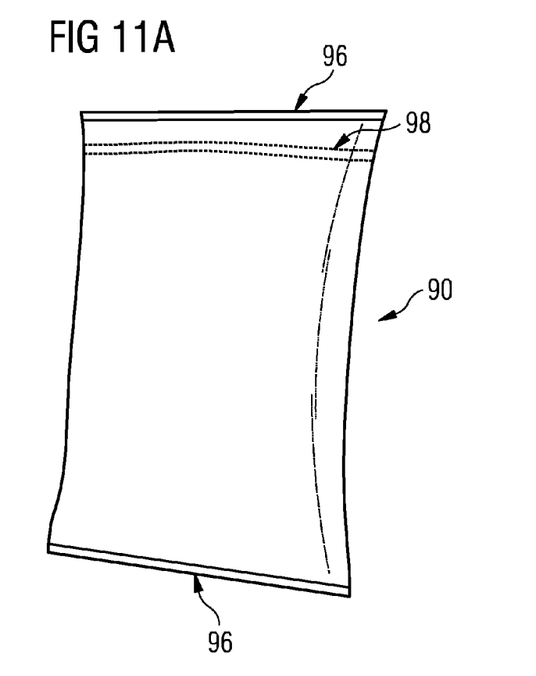
FIG. 11A shows another example of a packaging container produced from the packaging material according to embodiments described herein.
Figure 11B:
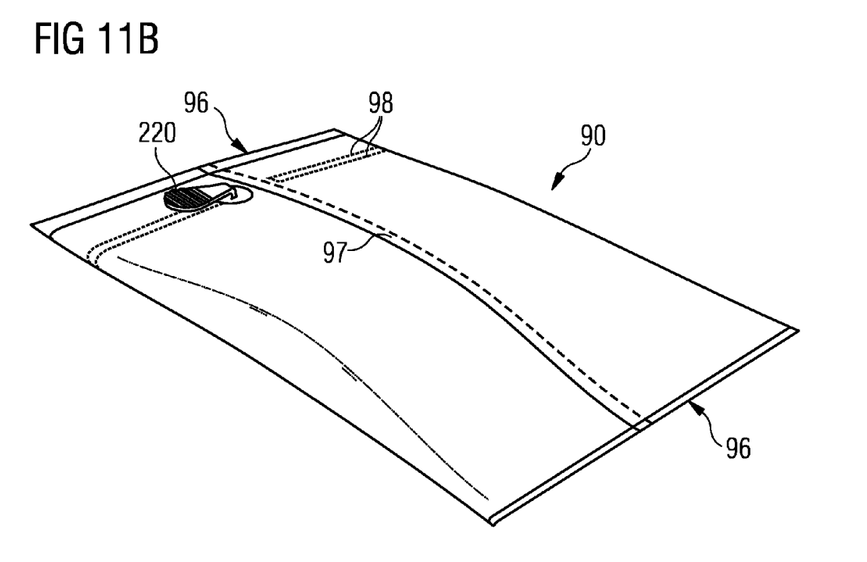
FIG. 11B shows the packaging container in FIG. 11A on the opposite side.

FIGS. 11A and 11B shows another example of a packaging container 90 shaped as a pouch produced from the packaging material with an opening device described before and in FIGS. 12A and B. The pouch 90 is produced in a similar way as described in FIG. 10. The packaging container 90 is particularly suitable for liquid or semi-liquid food products such as beverages, sauces, soups or the like. It could also be used for frozen food products. Typically, such a package has a volume of about 70 to 250 ml. The packaging container 90 has transversal and longitudinal seals 96 and 97.

Figure 12A:
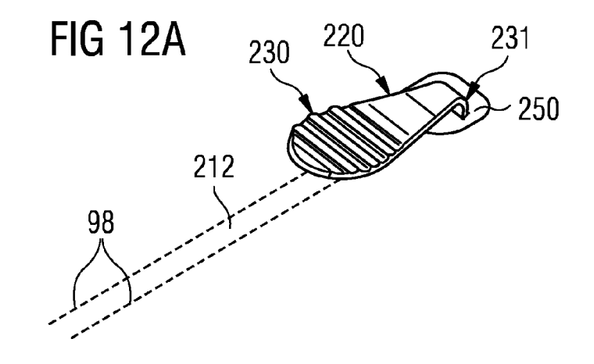
FIG. 12A shows a perspective view of a package material with an opening.
Figure 12B:
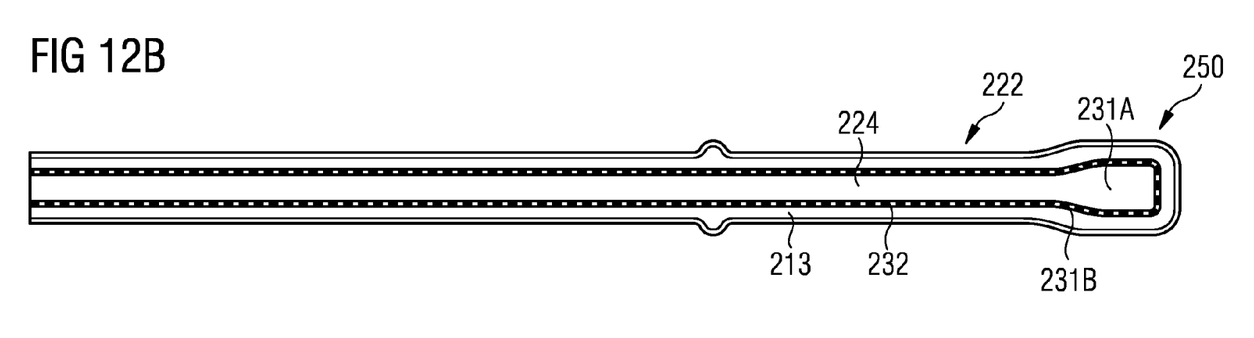
FIG. 12B shows a bottom view of a package material an embodiment in accordance with the present invention.

FIG. 12A shows a perspective view of a part of an opening device attached to a package material and to a packaging container 90 as shown in FIGS. 12A and 12B. The package material comprises a multilayer structure with one or more layers of plastic laminate. Between two layers of plastic laminate, one or more carton layers can be arranged. Such package material is well known and for example manufactured by Tetra Pak®.

The opening device itself comprises a first grip portion 220. The grip portion 220 contains several periodically arranged ripples 230 for an improved grip by a user. Grip portion 220 is attached to a bridge portion 231 penetrating through the material in penetration area 250. Penetration area 250 contains at least one layer less than the surrounding material in the present embodiment.

A bottom view of an embodiment of the opening device attached to the package material is illustrated in FIG. 12B. The opening device is injected molded into the package material, wherein as stated above, the bridge portion 231 (only shown in FIG. 12A) connects the first portion to a second portion 222 shown in FIG. 12B. Second portion 222 comprises a substantial rectangular plastic material area, 224. Area 224 is arranged over the penetration area 250 and extends from the longitudinal sealing 97 around the packaging container 90 and stops before the longitudinal sealing 97, as can be seen in FIGS. 11A and 11B. There is a gap over the longitudinal sealing 97 where there is no opening. Often this opening is arranged close to the longitudinal sealing 97, but it could also be arranged in the middle of the packaging container 90 with approximately equal distance to the two transversal sealings 96. The area 224 can also be arranged on two perforation lines 98 in a similar way as described before.

Area 231A comprises a rectangular shape in the upper part adjacent to penetration area 250 and is rounded 231B in to a single track or single recess 232. Rupture section 213 comprises a higher thickness. The single rupture recess 232 could also be a multi rupture recess. When the package material is ruptured by a user, the recess 232 supports for guiding the opening of the package container.

Bridge 231 (not shown) is arranged in a similar way as described in FIG. 2.

The thickened areas on both sides of the recess 232 prevent a pulling of the rupturing out from its intended path.

The package material may comprise two weakening lines 98, as mentioned before, implemented as perforation, which extend from the penetration area 250 in two approximately parallel lines. The package material can be ruptured along these perforations to create an opening in a package made from such material. Consequently, area 212 between the two perforations 210 acts as an opening.

The invention claimed is:

1. A package material assembly for forming a container, the package material assembly comprising:
   a package material structure formed of one or more layers of plastic laminate;
   a penetration area defined in the package material structure;
   at least one weakening line in the package material structure extending from the penetration area and defining an opening area of the package material structure; and
   an opening device, the opening device comprising:
      a first portion attached to an outer surface of the package material structure;
      a second portion attached to an inner surface of the package material structure, wherein a material layer of the second portion at least partially covers the opening area; and
      a material bridge penetrating through the penetration area and connecting the first portion of the opening device to the second portion of the opening device,
      wherein the second portion of the opening device includes a rupture section comprising:
         an inner rupture section portion situated inside the opening area,
         an outer rupture section portion situated outside of the opening area, the inner rupture section portion having a larger thickness than the outer rupture section portion, and
         a rupture recess bounded by the inner and outer rupture section portions, wherein the rupture recess is disposed over the at least one weakening line and is configured to guide a rupture of the package material structure along the at least one weakening line,
    wherein a thickness of the material layer of the second portion of the opening device is larger than a thickness of a material layer within the rupture recess and smaller than the thickness of the inner rupture section portion.

2. The package material assembly of claim 1,
    wherein the package material comprises two weakening lines, each weakening line having a first end and a second end, the two weakening lines defining the opening area therebetween,
    wherein the first ends of the two weakening lines extend from the penetration area, and
    wherein at least a portion of the material layer of the second portion of the opening device extends between the second ends of the two weakening lines.

3. The package material assembly according to claim 2, wherein a thickness of the portion of the material layer extending between the second ends of the two weakening lines is larger than the thickness of the rupture recess and smaller than the thickness of the inner rupture section portion.

4. The package material assembly according to claim 2, wherein the rupture section covers the two weakening lines to their respective second ends.

5. The package material assembly according to claim 2, wherein the rupture recess transforms into a recess bulge over the second end of one of the two weakening lines.

6. The package material assembly according to claim 2,
    wherein the second portion of the opening device comprises a penetration area recess extending across a portion of the second portion of the opening device covering the penetration area, and
    wherein the penetration area recess extends between the first ends of the two weakening lines.

7. The package material assembly according to claim 6,
    wherein the rupture section includes two rupture recesses, each rupture recess disposed over one of the weakening lines, and
    wherein the penetration area recess joins with the two rupture recesses, such that the rupture recesses and the penetration area recess form a continuous recess structure in the second portion of the opening device.

8. The package material assembly according to claim 1, wherein the second portion of the opening device covers the penetration area and at least one of the following:
    an area outside the at least one weakening line;
    an area outside the penetration area;
    an area surrounding the penetration area, the at least one weakening line, and the opening area.

9. The package material assembly according to claim 1, wherein the rupture recess is a triangular recess forming of a portion of a sawtooth structure of the second portion of the opening device.

10. The package material assembly according to claim 1, wherein the thickness of the material layer within the rupture recess is about 10% to 20% of an average thickness of the material layer surrounding the rupture recess.

11. The package material assembly according to claim 1, wherein a width, along a lateral direction of the package material, of the inner rupture section portion is larger than a width of the outer rupture section portion.

12. The package material assembly according to claim 1, wherein the at least one weakening line is a perforated line that perforates through all layers except for one layer of the package material.

13. A package container comprising the package material assembly according to claim 1 that is formed into a package container.

14. The package material assembly according to claim 1,
    wherein the rupture section includes at least one step between the inner rupture section portion and the material layer of the second portion of the opening device, and
    wherein the at least one step extends around an end of the rupture recess such that the step extends along inner and outer sides of the rupture recess.

15. A package material assembly for forming a container, the assembly comprising:
    a package material structure formed of one or more layers of plastic laminate;
    a penetration area defined in the package material structure;
    two weakening lines in the package material structure defining an opening area of the package material structure therebetween,
        wherein the two weakening lines are configured to allow removal of the opening area to create an opening of the package material, and
        wherein each weakening line has a first end and a second end, the first ends of the two weakening lines extending from the penetration area; and
    an opening device, the opening device including:
        a first portion attached to an outer surface of the package material structure;
        a second portion attached to an inner surface of the package material structure, a material layer of the second portion at least partially covering the opening area; and
        a material bridge penetrating through the penetration area and connecting the first portion of the opening device to the second portion of the opening device,
        wherein the second portion of the opening device includes a rupture section comprising:
            an inner rupture section portion situated on an inner side of the opening area,
            an outer rupture section portion situated outside of the opening area, the inner rupture section portion having a larger thickness than the outer rupture section portion, and
            a rupture recess bounded by the inner and outer rupture section portions, wherein the rupture recess is disposed over one weakening line and configured to guide a rupture of the one weakening line,
        wherein a thickness of the material layer of the second portion of the opening device is larger than a thickness of the rupture recess and smaller than the thickness of the inner rupture section portion, and
        wherein at least a portion of the material layer of the second portion of the opening device extends between the second ends of the two weakening lines.

16. The package material assembly according to claim 15, further comprising:
    two rupture recesses, each rupture recess disposed over one weakening line; and
    a penetration area recess extending across a portion of the second portion of the opening device covering the penetration area, wherein the penetration area recess joins with the two rupture recesses such that the rupture recesses and the penetration area recess form a single, continuous recess structure in the second portion of the opening device.

17. The package material assembly according to claim 15, wherein the rupture section includes at least one step between the inner rupture section portion and the material layer of the second portion of the opening device, wherein the at least one step extends around an end of the rupture recess such that the step extends along inner and outer sides of the rupture recess.

* * * * *